United States Patent Office 3,425,511
Patented Feb. 4, 1969

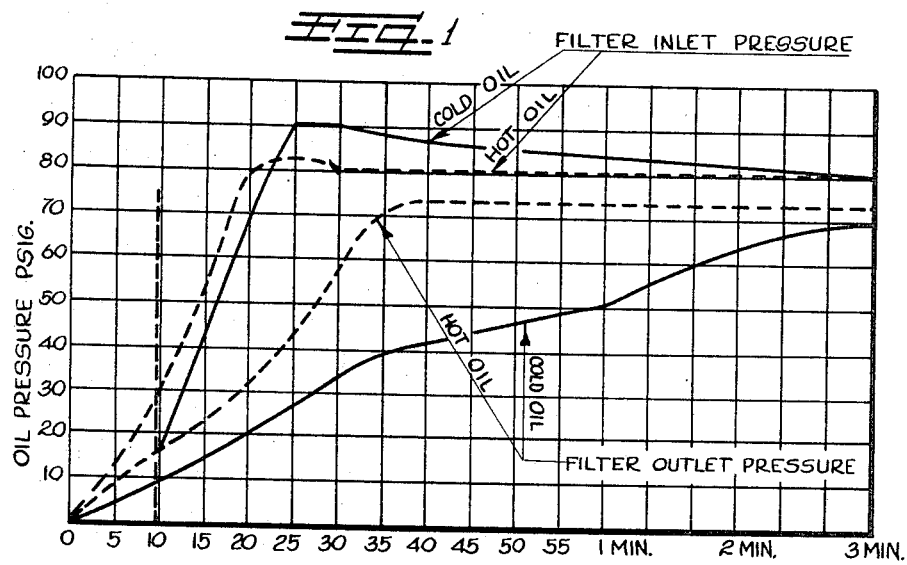
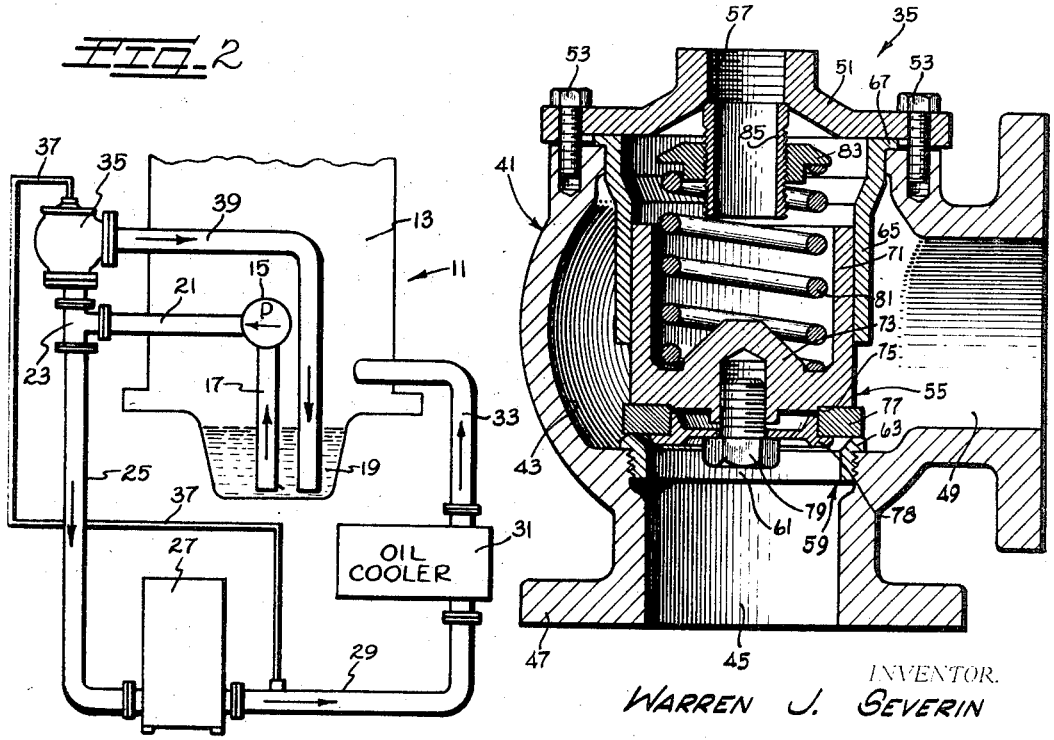

3,425,511
LUBRICATION SYSTEM AND VALVE THEREFOR
Warren J. Severin, Morton Grove, Ill., assignor to William W. Nugent & Co. (Inc.), Skokie, Ill., a corporation of Illinois
Filed Mar. 16, 1966, Ser. No. 534,842
U.S. Cl. 184—6      4 Claims
Int. Cl. F01m 1/00; F16n 17/06, 39/06

ABSTRACT OF THE DISCLOSURE

A lubrication system is provided which includes an engine having a reservoir containing lubricant, a pump for circulating the lubricant, a lubricant filter, and a valve. The valve inlet is connected both to the pump outlet and the filter and when this pressure differential is exceeded, reservoir, and a pressure-sensing port of the valve is in pressure responsive communication with the filter outlet. The valve is responsive to a pressure differential across the filter and when this pressure differential is exceeded, the output from the pump is directed back into the engine reservoir, by-passing both the filter and the portions of the engine to be lubricated.

---

The present invention relates to lubrication systems for internal combustion engines. The invention also relates to valves incorporated into such systems.

Internal combustion engines conventionally have associated therewith a system for introducing a lubricant into the engine bearings. As the lubricant passes through the system, it picks up metal particles and other impurities which, if re-introduced into the bearing header, would cause severe damage to the bearings. This problem is, of course, present in the operation of any internal combustion engine but it is of particular concern in very large engines such as are employed aboard ships, in electrical generating stations, and in pumping stations. The replacement of the bearings in such engines is a major maintenance project necessitating a prolonged shut down of the engine. Thus, the introduction of damaging impurities into such bearings, which will result in costly bearing loss and a major maintenance project, cannot be tolerated.

To protect the engine bearings, it is customary to place a filter in the system through which the lubricant is forced by the circulating pump. Under most operating conditions, the filter is quite effective in removing impurities from the lubricant. However, when a cold engine is started, the circulating pump produces a momentary surge on first fire of the engine, creating a much greater pressure at the filter input than at the filter output with a resulting high pressure differential across the filter. This high pressure can cause the filter to fail, as hereinafter set forth, and render it ineffective during normal operating conditions.

By way of example, FIGURE 1 illustrates graphically the pressure of the lubricant of an internal combustion engine at both the filter input and filter output under certain conditions. The full lines represent the filter input pressure and the filter output pressure when starting an engine in which the lubricant is cold. It will be noted that at time 25 seconds, the pressure differential across the filter is 63 p.s.i.g. as compared with a pressure differential of 10 p.s.i.g. at time three minutes as the engine approaches normal operating conditions. The broken lines in FIGURE 1 represent the filter inlet and filter outlet pressures when the lubricant is hot, as when a hot engine is being re-started. Under such conditions, the maximum pressure differential in the example is approximately 50 p.s.i.g.

At high pressure differentials, a filter is subject to channeling, that is, to the creation of passageways within the filter unit through which oil containing impurities can pass. Once the filter has become channeled, it is no longer capable of fully protecting the engine bearings from damaging impurities even when the high pressure has been relieved.

To minimize filter channeling, engine filters have been provided with internal by-pass relief valves. When the pressure differential across these filters reaches a predetermined value, the oil by-passes the filter and is discharged directly into the bearing header. While this approach serves to prevent channeling of the filter, it subjects the bearings to unfiltered oil for a period of several minutes and thus defeats the purpose for which the filter was initially provided.

It is the principal object of the present invention to provide an improved lubrication system for internal combustion engines.

A more particular object of the invention is to provide an improved engine lubricating system which includes an oil filter and means for protecting the filter from an excessive pressure differential without allowing unfiltered oil to pass into the engine bearings.

An additional object of the invention is to provide a lubricating system which includes an improved pressure relief valve.

Other objects and advantages of the invention will become apparent through reference to the following description and accompanying drawing.

In the drawing:

FIGURE 1 is a graphic representation of the pressure of the lubricant of an internal combustion engine at both the filter input and filter output, when the lubricant is hot and when the lubricant is cold, from the starting of the engine until three minutes thereafter, as previously discussed;

FIGURE 2 is a schematic diagram of the lubrication system of an internal combustion engine showing various of the features of the invention; and FIGURE 3 is a center sectional view of a valve incorporated into the system of FIGURE 2 and showing various of the features of the invention.

A lubricating system 11 of an internal combustion engine 13 is shown in FIGURE 2 and includes a pump 15, the inlet of which communicates through a pipe 17 with the sump or fluid reservoir 19 of the engine. The pump exhausts through a pipe 21 to a T-joint 23, one side of which is connected through a pipe 25 to the inlet of a filter unit 27. The filter outlet is connected by means of a pipe 29 to an oil cooler 31 which discharges through a pipe 33 into the bearing header (not shown) of the engine. The other side of the T-joint 23 is connected to the inlet of a differential pressure valve 35, thus subjecting one side of the valve to the filter inlet pressure. A conduit 37 connects the valve 35 to a point adjacent the filter outlet so as to subject another side of the valve to the filter outlet pressure. When the difference between the filter inlet pressure and filter outlet pressure, i.e., the pressure differential across the filter, reaches a predetermined value, the valve 35 opens, as hereinafter set forth, and discharges through a pipe 39 directly into the engine sump 19.

Thus in the operation of the system, when the engine 13 is started, the capacity of pump 15 increases very rapidly. The filter is unable to pass this quantity of flow as rapidly as it is delivered and accordingly, there is a build-up of pressure in pipes 21, 25 and at the filter inlet which greatly exceeds the pressure at the filter outlet. Both pressures are communicated to the valves 35 and, when the pressure differential exceeds a predetermined value, which is less than that at which channeling will occur in the filter, the valve opens, discharging the excess pump capacity directly into the engine sump and limits the pressure across the filter without discharging unfiltered lubricant into the bearing header.

A pressure relief valve 35, which is particularly adapted to be used with the aforementioned lubrication system, is illustrated in FIGURE 3 and includes a hollow body 41 providing an inner chamber 43. A valve inlet 45 is defined by the body 41 and is encircled by a flange 47 to facilitate connection of the valve to the T-Joint 23. A valve outlet 49 is defined by a wall of the body 41 adjacent the inlet port 45 so that the axes of the inlet and outlet are essentially perpendicular to each other.

That side of the body 41 which is opposite to the valve inlet 45 is closed by a removable cover plate 51 held in place by suitable fasteners 53. The removability of the cover plate 51 permits access to the chamber 43 for insertion of a movable valve element 55, hereinafter described. The cover plate is provided with a threaded central opening or pressure sensing port 57 to which the conduit 37 in communication with the filter outlet is connected.

The valve element 55 is supported within the valve body 41 on a valve seat 59 which includes a neck 61 adapted to be received at the inner end of the valve inlet 45, and a flange 63 projecting radially outwardly from the neck. That surface of the flange which projects inwardly of the valve chamber 43 is peaked to provide essentially a circular line contact between the valve seat 59 and the movable valve element 55.

The valve element 55 is guided in its movement within the valve chamber 43 by a sleeve 65 which is secured adjacent the cover plate 51 and projects inwardly of the chamber to approximately the central axis of the valve outlet 49. The outer edge of the sleeve is provided with a flange 67 which is positioned intermediate the cover plate 51 and the valve body 41 and is clamped to the valve body by the fasteners 53. The inner surface of the cover plate is recessed to receive the flange 67. In addition to guiding the valve element, the sleeve also serves to isolate the pressure sensing port 57 from the valve inlet and valve outlet.

The valve element 55 includes a hollow cupshaped piston having generally cylindrical side walls 71 extending upwardly from a base 73 and adapted for slideable engagement with the side walls of the sleeve 65. The side walls 71 of the piston have an outer diameter closely approximating the diameter of the peak of the valve seat 63 so that the effective area of the valve element exposed to the valve inlet pressure is essentially the same whether the valve is open or closed. The base 73 is provided with a circular recess 75 about its periphery to receive an annular gasket 77 preferably constructed of rubber or other resilient material and clamped in place by a retaining ring 78 secured to the base 73 by a bolt 79. The gasket 77 rests upon the peaked upper edge of the valve seat 59 when the valve is closed and has an outer diameter somewhat greater than that of the base 75 of the valve element.

The valve element is biased toward a seated position by a helical compression spring 81, one end of which is in engagement with the inner surface of the base 73 of the valve member. The spring 81 extends upwardly within the sleeve 65 from the base 73 into engagement with the lower surface of a collar 83 threaded externally onto a tube 85 which bears against the inner surface of the cover plate 51 in axial alignment with the opening 57 thereof. The tube 85 thus provides communication between the opening 57 in the cover plate 51 and the upper face of the base 73 of the valve element 55. The threaded attachment of the collar to the tube 85 permits adjustment of the biasing force, as in the initial assembly of the valve. Usually, this setting is 15 to 20 p.s.i.g.

As previously mentioned, the pressure relief valve 35 is particularly adapted for use in connection with the lubrication system of an internal combustion engine such as is shown in FIGURE 2. In the incorporation of the valve into such a system the inlet port 45 is placed in communication with one side of the T-joint 23, thereby subjecting the lower face of the base 73 of the piston to the pressure of the lubricant at the filter inlet. The outlet 49 of the relief valve is connected to the pipe 39 leading to the engine sump. The pressure sensing port 57 of the cover plate 51 is connected to the conduit 37, thus subjecting the upper surface of the base 73 of the piston to the filter outlet pressure.

In operation, when the engine is started and a large pressure differential is created across the filter 27, a similar pressure differential is created across the base 73 of the valve element 55, creating an upward force on the valve element which is resisted by the force of the compression spring 81, which force is adjusted so as to retain the valve element in a seated position until the pressure differential exceeds a given value.

When the pressure differential exceeds this given value, the piston is moved upwardly thereby providing communication between the valve inlet and valve outlet and allowing unfiltered oil to pass through the relief valve and back into the sump 19 of the engine. This flow of oil through the valve 35 limits the differential pressure across the full flow filter 17 without allowing any unfiltered oil to enter the bearings and other parts of the engine and continues until the pressure differential is reduced.

While the present invention has been shown and described with respect to a preferred embodiment thereof as incorporated into the lubrication system of an internal combustion engine, it should be apparent that various modifications may be made in the embodiment shown and described without departing from the scope of the invention, and that the invention has application in other hydraulic systems which include equipment which it is desirable to protect against differential pressure.

Various of the features of the invention are set forth in the following claims.

What is claimed is:

1. A lubrication system for an engine which includes a reservoir containing lubricant for the engine, which system comprises a pump having an inlet and an outlet; means providing communication between the pump inlet and the lubricant in the reservoir, a lubricant filter having an inlet and an outlet, a valve comprising a hollow valve body defining an inner chamber and having a valve inlet, a valve outlet and a pressure sensing port in communication with said chamber, means within said chamber isolating said pressure sensing port from said valve inlet and valve outlet and including a valve element having one surface in communication with said valve inlet and an opposite surface in communication with said pressure sensing port, said valve element being movable within said inner chamber in response to a pressure differential between said pressure sensing port and said valve inlet between a closed position wherein it obstructs the passage of lubricant through said valve and an open position in which it permits communication between said valve inlet and said valve outlet, means biasing said valve element to said closed position, means providing communication between said pump outlet and each said filter inlet and said valve inlet, means providing communication between said valve pressure sensing port and said filter outlet, and means providing communication between said valve outlet and said reservoir.

2. In a lubrication system for an engine having a reservoir containing lubricant for the engine, which system includes a pump having an inlet and an outlet, means providing communication between the pump inlet and the lubricant in the reservoir, and a lubricant filter having an inlet and an outlet; a valve comprising a hollow valve body defining an inner chamber and having a valve inlet; means external to said valve inner chamber exclusive of said engine and pump adapted to connect said valve inlet to each the pump outlet and the filter inlet; said valve body also defining a valve outlet adapted to be connected to the lubricant reservoir and a pressure sensing port adapted to be connected to the filter outlet; means within said chamber isolating said pressure sensing port from said valve inlet and valve outlet and including a valve element having one surface in communication with said valve inlet and an opposite surface in communication with said pressure sensing port, said valve element being movable within said inner chamber between a closed position wherein it obstructs the passage of lubricant through said valve and an open position in which it permits communication between said valve inlet and said valve outlet, and means biasing said valve element to said closed position.

3. A system in accordance with claim 1 wherein the effective surface area of said valve element in communication with said valve inlet when said valve element is in said closed position and against which the pressure of the lubricant is exerted to produce a movement of the valve element, is not appreciably increased when said valve element is moved to said open position.

4. A system in accordance with claim 1 wherein a sleeve surrounds said pressure sensing port of said valve body and extends inwardly therefrom into said valve chamber, wherein said valve element is slidably carried within said sleeve and includes cylindrical side walls and a base wall effective to obstruct communication between said pressure sensing port and each of said valve inlet and said valve outlet, and wherein a valve seat for said valve element is provided at said valve inlet and defines a circular ridge engageable by said valve element, said ridge having a diameter equal to the outer diameter of said cylindrical side walls.

References Cited

UNITED STATES PATENTS

| | | | |
|---|---|---|---|
| 2,536,663 | 1/1951 | Schaer | 210—130 |
| 2,748,947 | 6/1956 | Jay | 210—130 |

HOUSTON S. BELL, JR., *Primary Examiner.*

184—104; 210—130, 168; 137—117